(12) United States Patent
Wang

(10) Patent No.: US 7,290,742 B2
(45) Date of Patent: Nov. 6, 2007

(54) ADJUSTABLE SUPPORT TOOL FOR VERTICAL AND HORIZONTAL MOUNTING

(76) Inventor: Dennis H. Wang, c/o Philip K. Yu. Attorney at Law, 20955 Pathfinder Rd., Ste. 100, Diamond Bar, CA (US) 91765

( * ) Notice: Subject to any disclaimer, the term of this patent is extended or adjusted under 35 U.S.C. 154(b) by 345 days.

(21) Appl. No.: 11/086,114

(22) Filed: Mar. 21, 2005

(65) Prior Publication Data

US 2005/0205729 A1    Sep. 22, 2005

Related U.S. Application Data

(60) Provisional application No. 60/554,978, filed on Mar. 19, 2004.

(51) Int. Cl.
  *E04G 25/00*    (2006.01)
(52) U.S. Cl. ............... 248/200.1; 248/124.1; 248/161; 248/354.1; 52/127.2; 135/16; 410/151
(58) Field of Classification Search ............ 248/200.1, 248/354.1, 161, 122.1, 124.1, 124.2; 285/84, 285/312, 313; 403/105, 109.1, 109.3, 109.6; 410/143, 145, 151; 135/16, 90, 98; 52/127.2, 52/202, 203, 632, 651.07, 127.1, 126.1, 126.3, 52/726.3, 726.1, 736.1, 745.2, DIG. 12
See application file for complete search history.

(56) References Cited

U.S. PATENT DOCUMENTS 3,022,974 A * 2/1962 Knodel ................ 248/200.1
3,089,742 A * 5/1963 Powell ................ 312/223.5
5,988,963 A   11/1999 Shiau
6,247,882 B1   6/2001 Huang
6,698,984 B1 * 3/2004 Chen ........................ 410/151

* cited by examiner

Primary Examiner—Korie H. Chan
(74) Attorney, Agent, or Firm—Alan Kamrath; Kamrath & Associates P.A.

(57) ABSTRACT

An adjustable support tool for either vertical or horizontal mounting. The adjustable support tool comprises a rod slidably received by a tube. The rod has depressions formed thereon. A threaded portion is coupled to the tube and a hand grip tightener is turnable engaged to the threaded portion for adjusting their overall length. A ratchet housing is resiliently engaged to the hand grip tightener. The ratchet housing has a ratchet for securerly engaging to one of the depressions, a wheel spring for rollably engaging to another one of the depressions, a safety lock pivotally engaged to the ratchet housing for prevent access to the ratchet when locked. When the rod is slided, the wheel spring pushes up the ratchet from its underside to loosen its engagement. The loosened ratchet allows the rod to slide more smoothly, while protecting the painted surface on the rod. Both the ratchet and threaded portion provide adjustment to the overall length of the support tool.

24 Claims, 12 Drawing Sheets

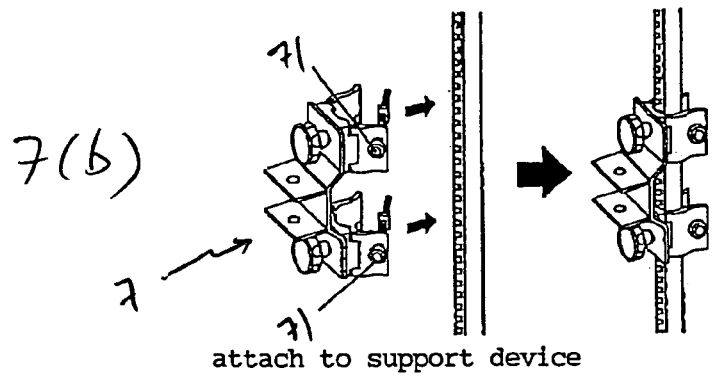
7(b)
attach to support device
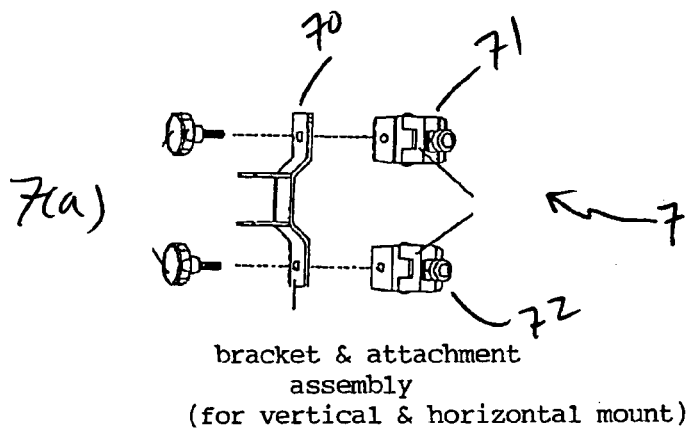
7(a)
bracket & attachment assembly
(for vertical & horizontal mount)
FIG. 7
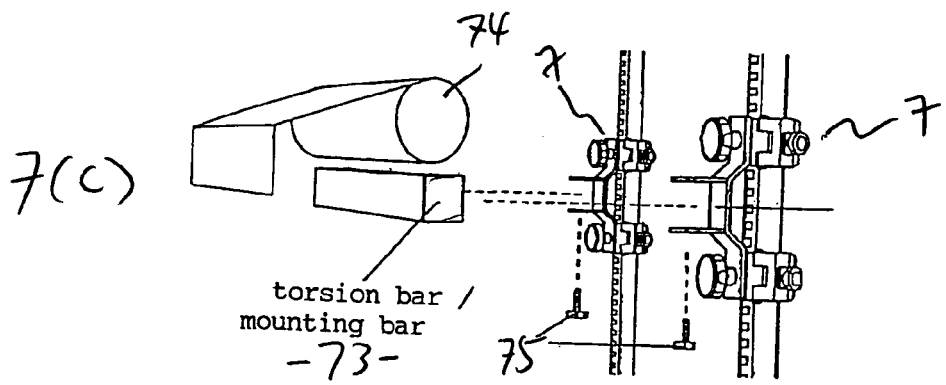
7(c)
torsion bar / mounting bar
-73-

Vertical Mount

Front View

8(a)

side view

8(b)

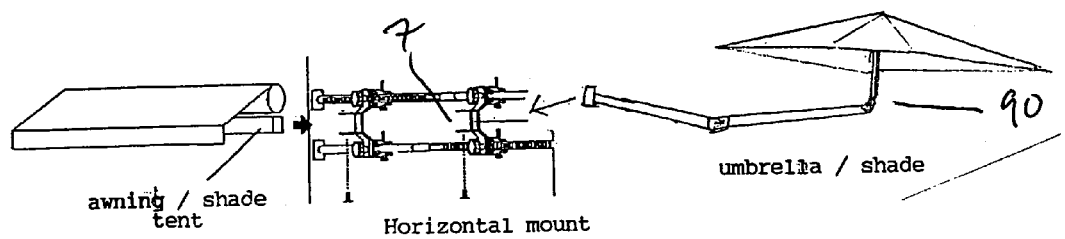
awning / shade tent    Horizontal mount    umbrella / shade
9(a)
FIG. 9
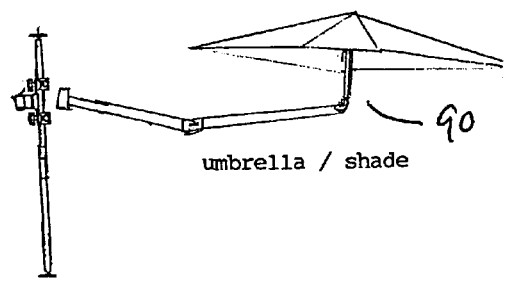
umbrella / shade
9(b)

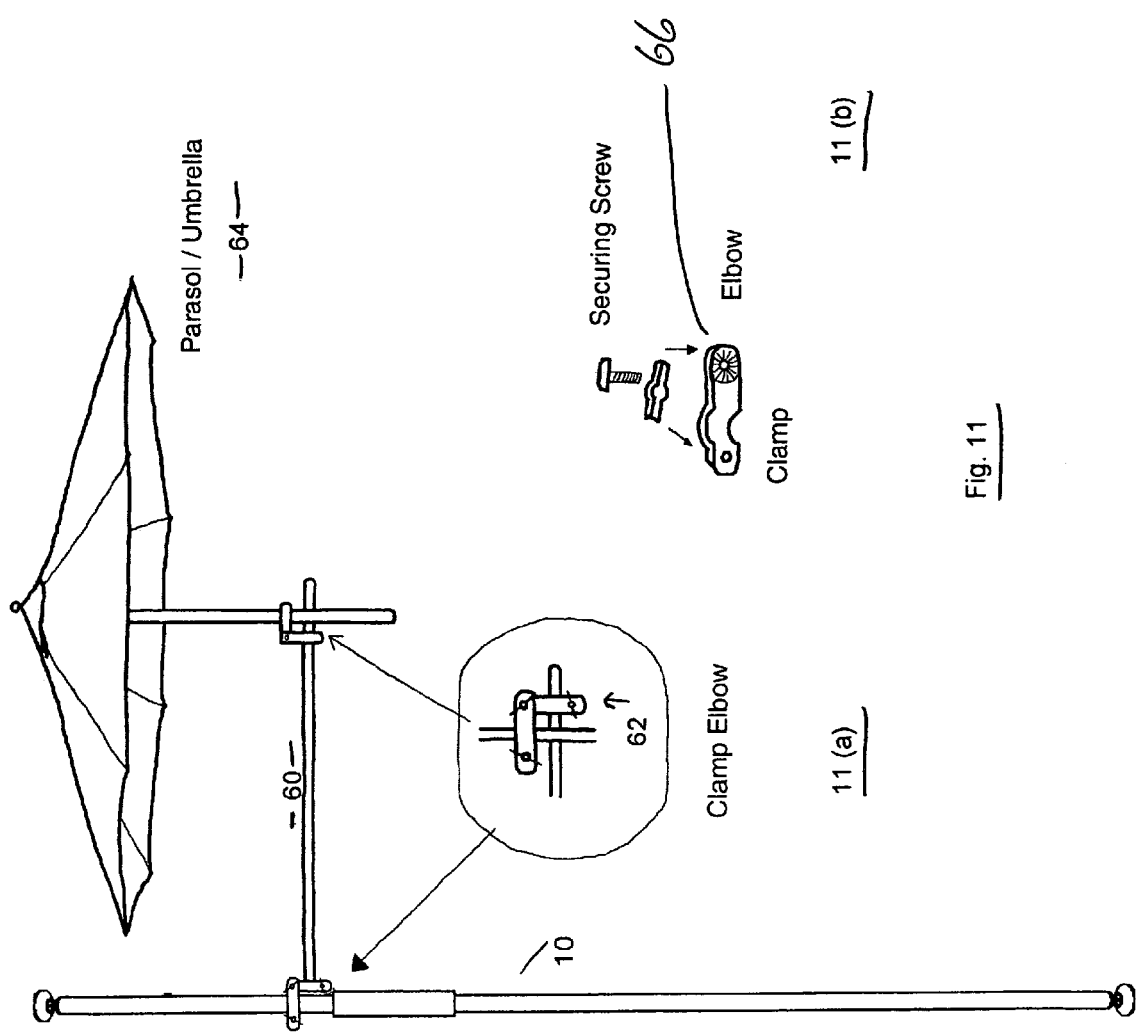

ADJUSTABLE SUPPORT TOOL FOR VERTICAL AND HORIZONTAL MOUNTING

RELATED APPLICATION

This application claims benefit under 35 U.S.C. § 119(e) of U.S. provisional application No. 60/554,978, filed Mar. 19, 2004, entitled ADJUSTABLE SUPPORT TOOL FOR VERTICAL AND HORIZONTAL MOUNTING, the entirety of which is hereby incorporated herein by reference.

ART BACKGROUND

Adjustable support tools have become quite common for home and industrial use. One example of such adjustable tool is disclosed by Huang in U.S. Pat. No. 6,247,882 (hereinafter "Huang"), issued on Jun. 19, 2001, entitled "CARGO BRACING DEVICE," and another example of an adjustable tool is disclosed by Shiau in U.S. Pat. No. 5,988,963 (hereinafter "Shiau"), issued on Nov. 23, 1999, entitled "CARGO POSITIONING FRAME." Both prior patents are incorporated by reference as if fully set forth herein.

The Huang patent discloses a bracing device including a rod slidably received in a tube and having a number of depressions. A lever (35) is pivotally secured to the tube and has a pawl (80) for engaging with the depressions (12) of the rod. A blade (40) is pivotally secured to the tube and has a bulge (43) for engaging with the depressions of the rod. A shaft (50) is slidably received in the tube and engaged with the blade for biasing the bulge to engage with the depressions of the rod. The shaft is selectively engaged with the lever for selectively forcing the pawl to secure the rod to the tube.

The Shiau patent discloses a tube of a cargo positioning frame made of a plate. The plate has a plurality of positioning holes and a plurality of upper chamfer angled holes. Each of the upper chamfer angled holds communicates with the respective positioning holes in order to position a pawl stably.

Such conventional adjustable tools still have their drawbacks. First, in the Huang patent, the shaft (50) often fails to provide a clear indication as to whether the lever is engaged or disengaged, thus creating confusion to the users. Also, as in both Huang and Shiau patents, a secondary, or fine, adjustment other than the positioning of the depressions (12) is often needed by the user, since the positions of the depressions are fixed and cannot accommodate too much variation. Last but not least, the pawl tends to scratch the paint off the surface of the rod when the rod is moved, thus causing the rod to be oxidized over time.

SUMMARY OF THE INVENTION

An adjustable support tool for either vertical or horizontal mounting is disclosed. The adjustable support tool comprises a rod slidably received by a tube. The rod has depressions formed thereon. A threaded portion is engaged to the tube as an external sleeve, or can be formed as threads on the tube, and a hand grip tightener is turnably engaged to the threaded sleeve for adjusting their overall length. A ratchet housing is resiliently engaged to the hand grip tightener. The ratchet housing has a ratchet for securely engaging to one of the depressions, a wheel spring for rollably engaging to another one of the depressions, a safety lock pivotally engaged to the ratchet housing for prevent access to the ratchet when locked. When the rod is slided, the wheel spring pushes up the ratchet from its underside to loosen its engagement. The loosened ratchet allows the rod to slide more smoothly, while protecting the painted surface on the rod. Both the ratchet and threaded sleeve provide adjustment to the overall length of the support tool.

In another embodiment in accordance with the present invention, an awning attachment can be used in connection with the adjustable support tool. The awning attachment can be a sun shade, a canopy or an umbrella. A bracket is used which provides cantilever support to the bracket. The bracket can be mounted to support either vertical or horizontal mounting of the support tools.

BRIEF DESCRIPTION OF THE DRAWINGS

FIGS. 7(a)-(c) illustrate the exemplary bracket 7 for use with the vertically mounted support pole and horizontally mounted awning attachment.

FIGS. 9(a)-(b) illustrate the exemplary awning and an umbrella mounted in a pair of horizontal poles.

FIGS. 11(a)-(b) illustrate the exemplary universal attachment for attaching an umbrella shade to the support pole through the use of a pair of "elbow clamps."

DETAILED DESCRIPTION OF THE PREFERRED EMBODIMENTS

Figure 1:
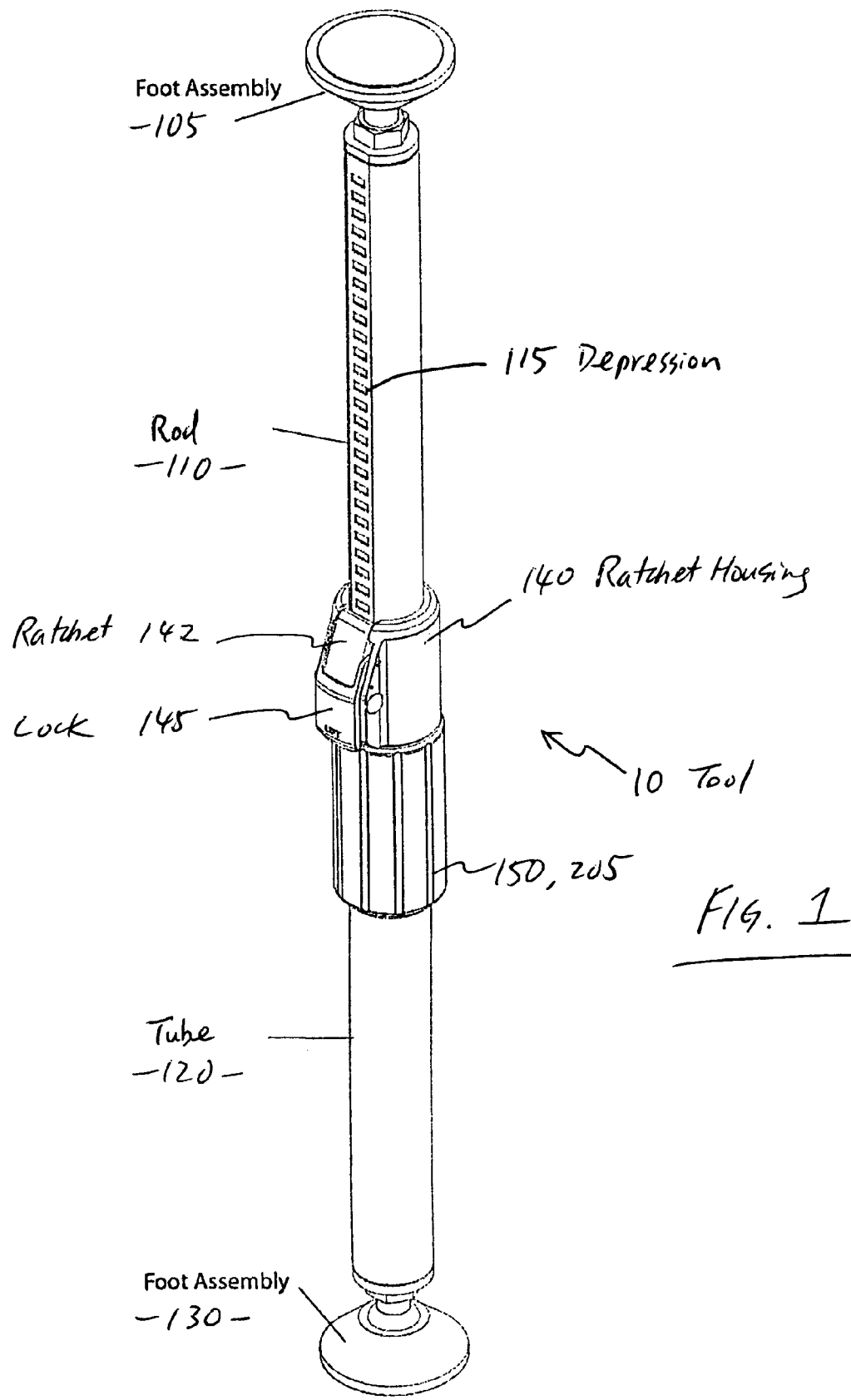
FIG. 1 illustrates an exemplary adjustable support tool 10 in accordance with the present invention.
Figure 2:
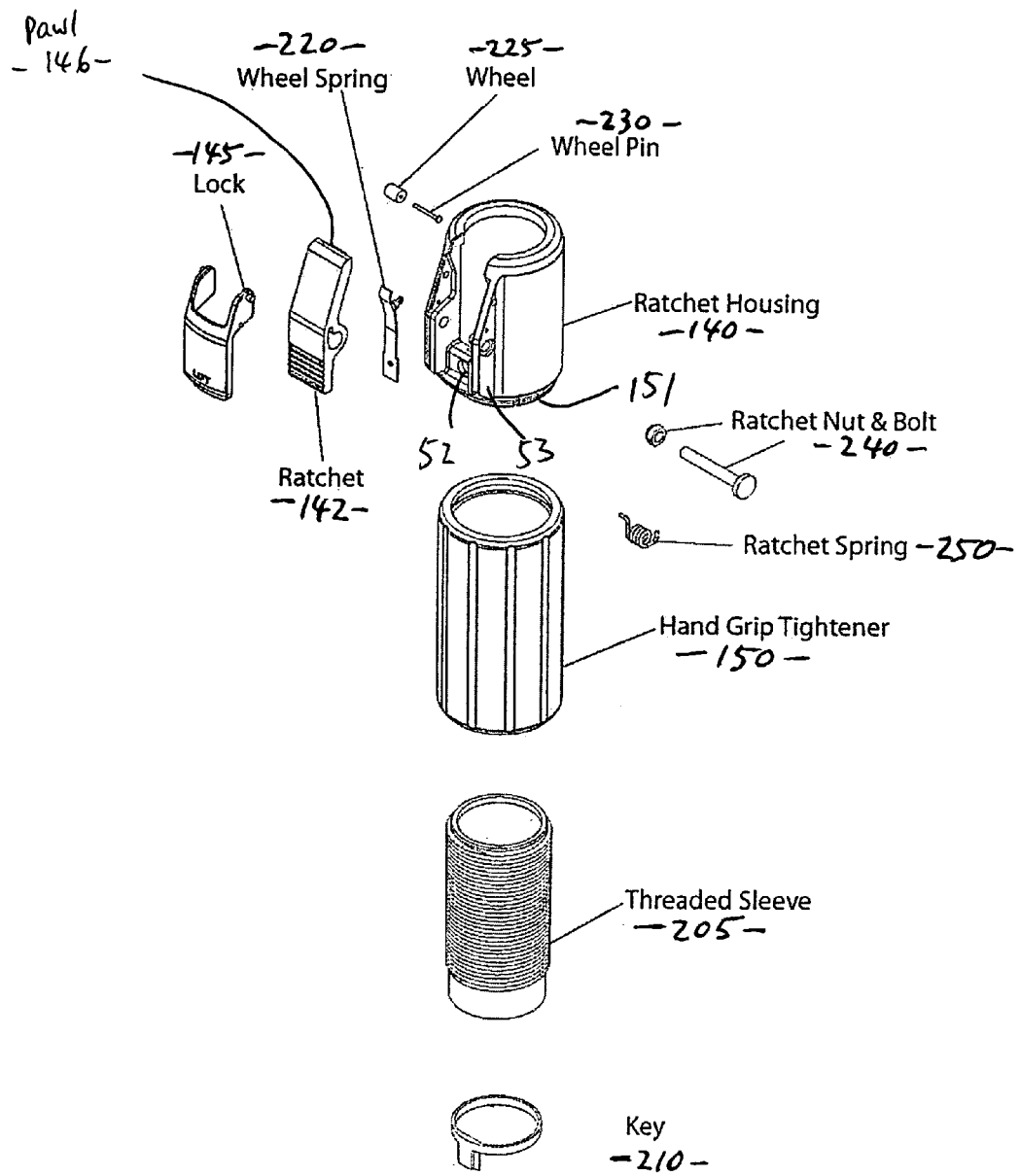
FIG. 2 illustrates an exemplary control and adjustment mechanism of the adjustable support tool in accordance with the present invention.
Figure 3:
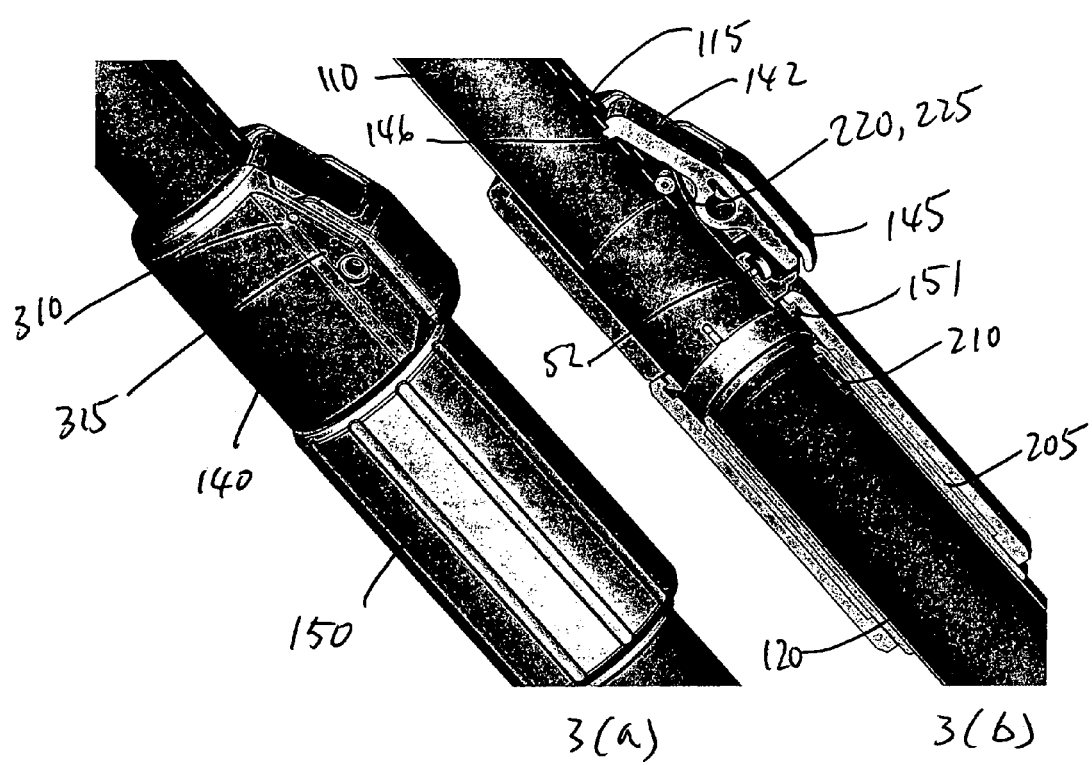
FIGS. 3(a)-(b) illustrate the exemplary control and adjustment mechanism in one embodiment with a cross-sectional view.
Figure 4:
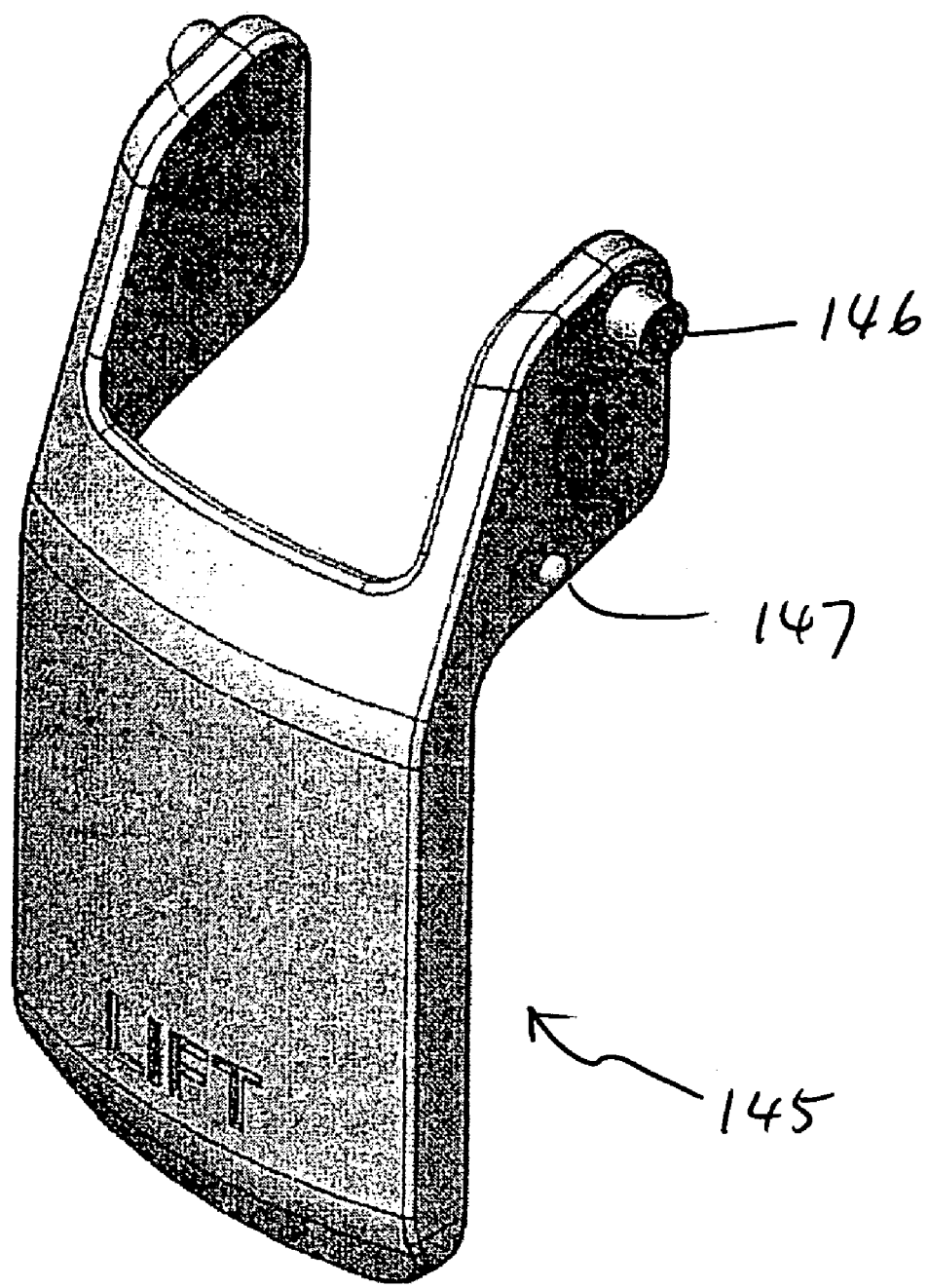
FIG. 4 illustrates the exemplary safety lock 145 on the ratchet housing.

Referring first to FIGS. 1-5, an adjustable support tool 10 for vertical and horizontal mounting in accordance with the present invention is disclosed. The tool 10 has a rod 110 slidably received in a tube 120 including an upper portion having a number of depressions 115 formed therein. The rod 110 and the tube 120 each includes one end having a foot assembly 105, 130, respectively, which is movably secured thereon for engaging the tube 10 to generally flat surfaces. For vertical mounting, the foot assembly 105, 130 can be adjusted to engage with the ceiling and floor surfaces, although either end may be the upper end. For horizontal mounting, the foot assembly 105, 130 can be adjusted to engage with vertical sidewall surfaces. The foot assembly 105, 130 may be rotatably or pivotally secured to the rod 110 or the tube 120, for allowing the foot assembly pieces to be solidly and stably engaged with the contact surfaces.

Opposite to the foot assembly 130 on the tube 120, a threaded sleeve 205 is attached to the end of the tube 120. A hand grip tightener 150 engages the threaded sleeve 205 in such way that the tightener 150 effectively adjusts the length of the tube 120 by tightening or loosening on the threaded sleeve 205. A key 210 (FIG. 5(b)), which is a ring shaped bracket with a protrusion tab, is positioned, or wedged, between the top lid of the tube 120 and the threaded sleeve 205 and acts as an alignment key for the tube 120, the threaded sleeve 205, the ratchet housing 140 and the rod 110, when the hand grip tightener 150 is adjusted. To assemble, the key 210 is first placed just below the top of the threaded sleeve 205, and then the tube 120 is inserted from the bottom of the threaded sleeve 205. The key 210 is used to maintain alignment of the rod 110 and the tube 120. Other ways of achieving alignment may be by pushing a couple of spots on the tube inward to create a flat surface or depression spots, thus forming a key to align the rod 110. However, such method is generally not accurate and may scratch or damage the tube.

Figure 5A:
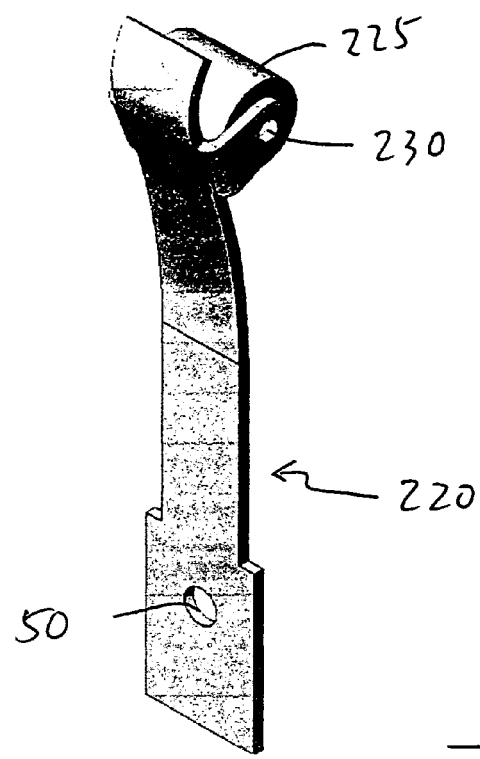
FIGS. 5(a)-(b) illustrate the exemplary wheel spring 220 and key 210 for use on the ratchet housing and the threaded sleeve.
Figure 5B:
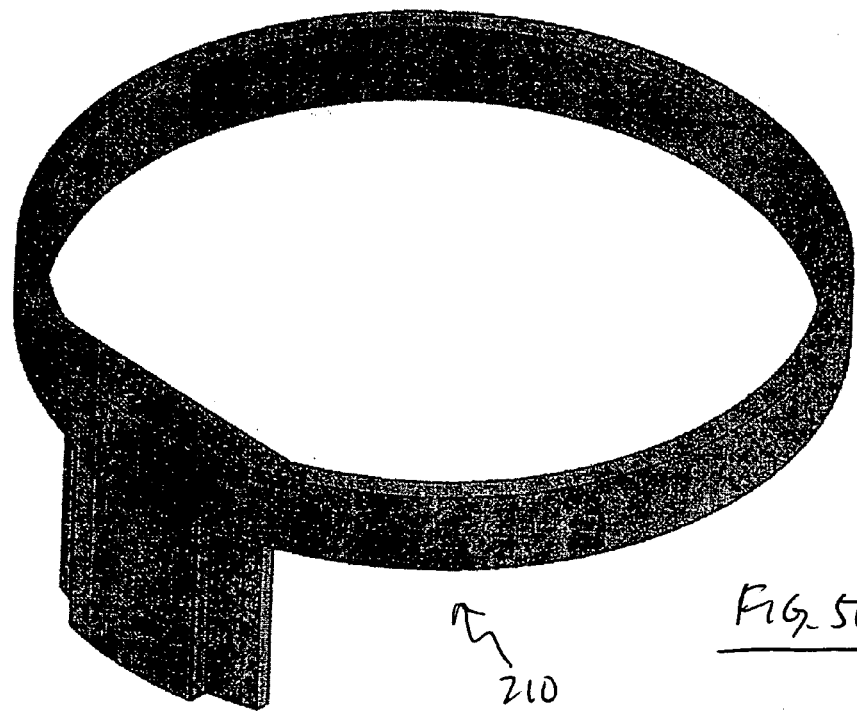
Figure 5C:
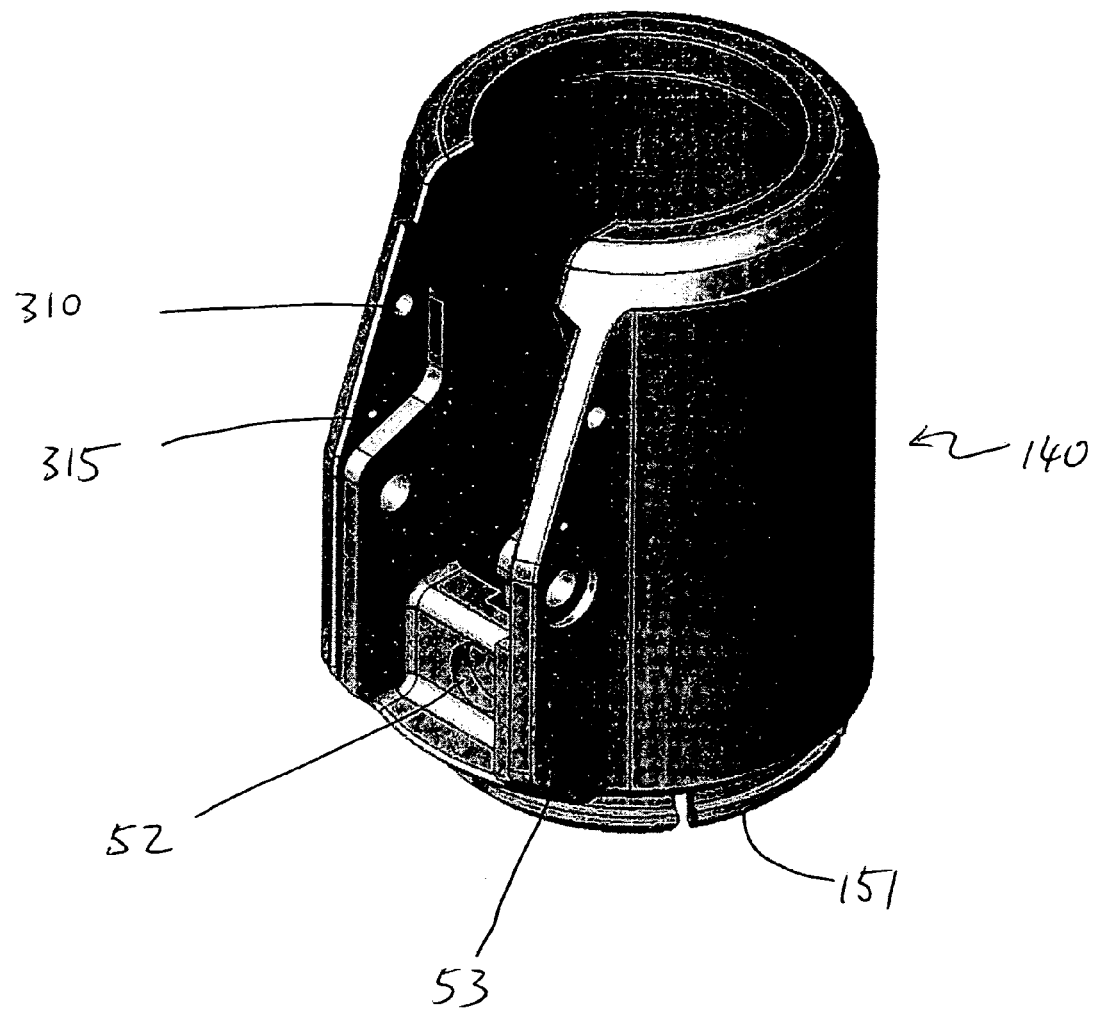
FIG. 5(c) illustrates the exemplary ratchet housing 140.

As more clearly shown in FIG. 5(c), the ratchet housing 140 is rotatably secured to the top of the hand grip tightener 150, through the resilient tabs 151 at the bottom of the ratchet housing 140. This way, the hand grip tightener 150 can still rotate, to adjust the length of the tube 120, while remaining secured to the ratchet housing 140.

On the ratchet housing 140, a ratchet 142 is pivotally secured to the flanges on an open side of the ratchet housing 140. The ratchet 142 includes a pawl 146 formed at its end for engaging one of the depressions 115. The ratchet 142 is biased by a ratchet spring 250 on the ratchet bolt 240, such that the ratchet 142 is normally engaging one of the depressions 115 by its pawl 146.

A lock 145 is also pivotally secured to the flanges 53 on the open side of the ratchet housing 140. The lock 145 includes a pair of protrusions 146 formed thereon for engaging the flanges at the holes 310 formed therein. Through the protrusions 146, the lock 145 can pivot from a closed position to an open position. When the lock 145 is opened, i.e. flipped up, the ratchet 142 can be manipulated by a user so as to release the ratchet's pawl 151 on the depression 115. When the lock 145 is closed, the lock 145 prevents any manipulation of the ratchet 142. The lock 145 also includes a pair of smaller protrusions 147 formed thereof, which engage the holes 315 when closed, for securing the lock 145 in place.

As more clearly shown in FIG. 5, a wheel spring 220, which includes a wheel 225 pivotally secured to it by the wheel pin 230, is preferably resiliently anchored underneath an indentation 52 of the ratchet housing 140 at a section joining the two flanges 53 and underneath the ratchet 142. As more clearly shown in FIG. 3(b), the wheel 225 normally rests upon one of the depressions 115, while the pawl 146 of the ratchet 142 partially engages one of the depression 115. When the rod 110 is to be retracted toward the tube 120, the downward movement causes the wheel spring 220 to roll up to the tab between the depressions with the tip of the wheel spring 220 pushing up against the underside of the ratchet 142. When pushed up, the ratchet 142 releases its pawl 146 from the depression 115, thus facilitating a smoother, and yet controlled, movement downward, until the wheel spring 220, 225 meets the next depression 115. When the rod 110 is to be extended away from the tube 120, the wheel spring also pushes up against the underside of the ratchet 142, causing the pawl 146 to be temporarily released until the wheel spring 220, 225 is back down to the next depression 115.

Thus, the wheel spring 220, 225 provides a smoother and controlled movement of the rod 110 with respect to the tube 120. Since the pawl 146 does not engage the depressions 115, due to the pushing by the wheel spring 220, when the rod moves upward or downward, the pawl 146 will not scratch the surface of the rod 110. Keeping the pawl 146 away from the depressions or the tabs in-between helps protect the painted surface of the rod 110 over the long run. The function and benefits of the wheel spring 220, 225 are clearly overlooked by the conventional tools.

Figure 6:
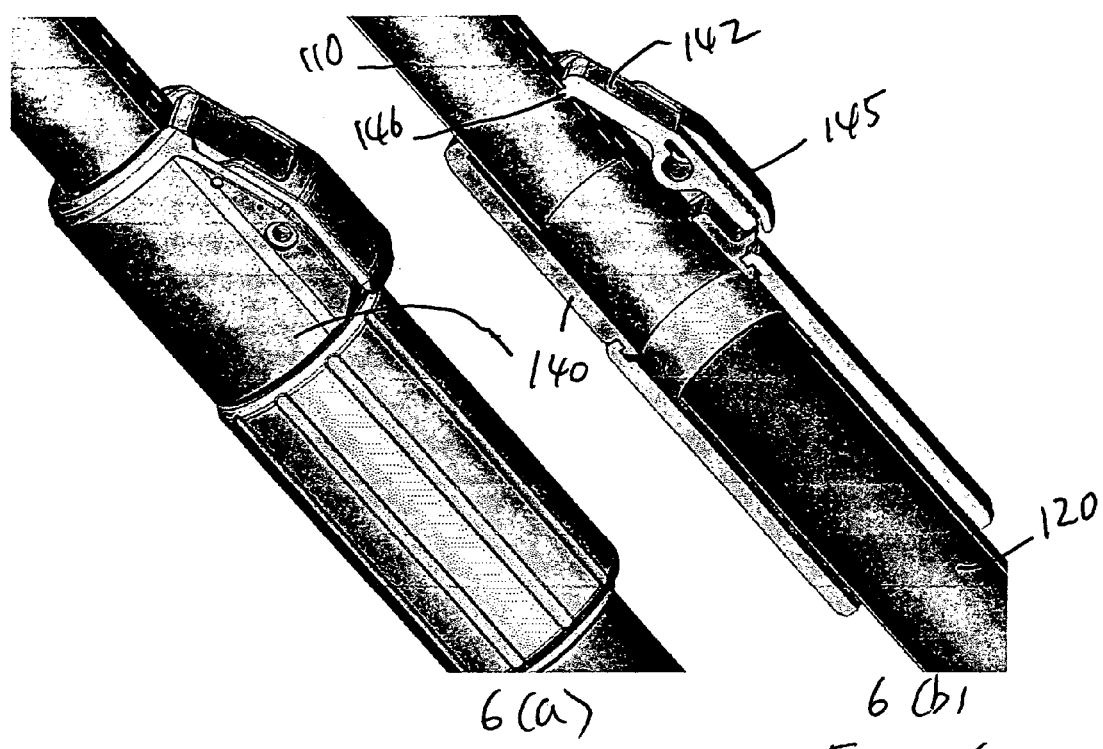
FIGS. 6(a)-(b) illustrate the exemplary control and adjustment mechanism without the wheel spring 220 and key 210 in another embodiment with a cross-sectional view.

FIGS. 6(a)-(b) illustrate an embodiment of the rod 110 and tube 120 design without the wheel spring. On the ratchet housing 140, the ratchet 142 has its pawl 146 engaging one of the depressions, under the lock 145. Also, the key 210 (as shown in FIG. 3(b)) is not included in this embodiment.

Operation of the Adjustable Support Tool. To operate the adjustable support tool 10 in accordance with the present invention, the support tool 10 is first placed between two horizontal or vertical surfaces. For example, the support tool 10 can be placed between a ceiling and a floor in a warehouse or in a garage. It can also be placed horizontally between the sidewalls at a balcony or a patio. To adjust, e.g. extend, the length of the support tool 10, the rod 110 can be slid out from the tube 120, through the ratchet housing 140. Since the movement causes the ratchet 142 to be pushed up by the wheel spring 220 (if employed in the embodiment) underneath, the rod 110 can be extended much quickly and smoothly, without the user having to constantly press the ratchet's button. When both foot assemblies 105, 130 are firmly engaged with the desired surfaces, further tightening can be achieved by rotating the hand grip tightener 150, thus extending the overall length of the hand grip tightener 150 and the threaded sleeve 205. As can be appreciated by those skilled in the art, while the depressions 115 on the rod 110 provide step-by-step increments to the overall length of the support tool 10, the rotational adjustment by the hand grip tightener 150 on the threaded sleeve 205 provides a continuous change in a much finer scale. The combination of both adjustments thus achieves much better engagement and stability than the conventional one having only one way of adjustment.

Additionally, when the hand grip tightener 150 is rotated during adjustment, the rest of the support tool 10, i.e. the rod 110, the tube 120 and the ratchet housing 140 remain fixed. Such localized rotation is quite advantageous, since the fine adjustment can be made without the user having to first remove any attachments mounted on the adjustable tool. Without such localized rotation, the user would have to remove the attachments from the tool, since the rotation would cause the whole tool to rotate.

When the rod 110, the ratchet housing 140 and the tube 120 are aligned and engaged by the key 210, the finer adjustment can be made by rotating only the hand grip tightener 150 around the threaded sleeve 205, without having to rotate the whole pole. This localized rotation is much more advantageous, and safer, than the conventional poles, where any secondary adjustments can only be made by rotating the whole pole, typically at the foot assemblies of the pole, thus requiring the users to first remove all the attachments from the pole.

To release the support tool 10 from its engagement position, the user first rotates, in a reverse direction, the hand grip tightener 150 around the threaded sleeve 205. This rotation loosens the engagement just a little. Then the lock 145 is flipped up, so that the ratchet 142 can be released by pressing of the ratchet's button. Thanks to the wheel spring 220 (if employed in the embodiment), the downward movement of the rod 110 is regulated by the wheel 225 of the wheel spring 220. In contrast, the conventional poles offer no such regulator by any wheel spring in their designs, and the downward movement could become quite fast, if not held up by the user's hand.

Application of the Adjustable Support Tool. The adjustable support tool 10 of the present invention can be used to provide one or more vertical or horizontal anchors, wherever such anchoring support is desired in the environment. For example, in a warehouse or in a garage, the support tool 10 can be implemented in a space between a ceiling and a floor. No drilling or permanent support is needed, if the adjustable support tool 10 in accordance with the present invention is used. With one or more support tool in place, shelves and racks can be installed using brackets, hangers or hooks. The length or height of the support tool 10 is adjustable so that when both foot assemblies 105, 130 are firmly engaged with the substantially flat surfaces, the support tool is thus firmly installed.

Further, the support tool 10 can be used to mount a variety of utility attachments, such as awnings, sun shades, canopies, garden umbrellas and the like, with the help of the brackets. As shown in FIG. 7(a), a bracket 7 includes a bridge 70, which includes a "U-shaped" brace with a pair of extended projections. The bracket 7 also includes a pair of adjustable clamps 71, 72, which can be rotatably secured to the extended projections at the bottom of the "U-shaped" brace. The orientation of the clamps 71, 72 can be adjusted before they are secured to the bridge 70, such that the bracket 7 is a universal bracket, whether it is for vertical or horizontal mounting. FIG. 7(b) shows the bracket 7 being attached to a vertical pole. To easy the attachment, each of adjustable clamps 71 has one of its prongs open wide, while the other prong remains fixed. FIG. 7(c) shows a pair of brackets 7, already secured to the vertical poles, receive the torsion bar part 74 of the awning 74.

It should be appreciated by those skilled in the art that the pair of extended projections can offset the cantilever force created by the awning attachments, when the bracket is mounted vertically.

Figure 8:
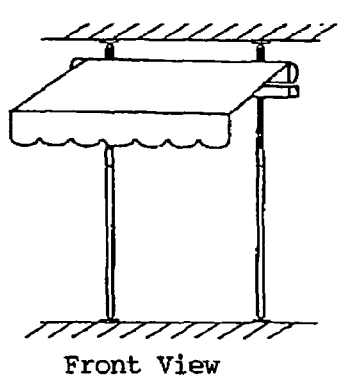
FIGS. 8(a)-(b) illustrate the exemplary awning mounted in a pair of vertical poles.
Figure 8:
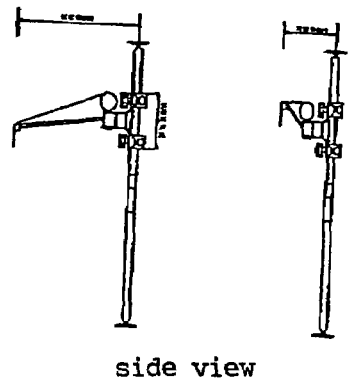

FIGS. 8(a)-(b) show the front and side views of a mounted awning in a vertically supported position.

FIGS. 9(a)-(b) shows the awning in a horizontally supported position, where the support tools are mounted horizontally to the sidewalls. The brackets 7 are still applicable since the clamps can be adjusted based on the desired orientation. An umbrella or shade attachment 90 is also shown attachable to the bracket 7, whether in a horizontally mounted support tool, or in a vertically mounted support tool as in FIG. 9(b).

Figure 10:
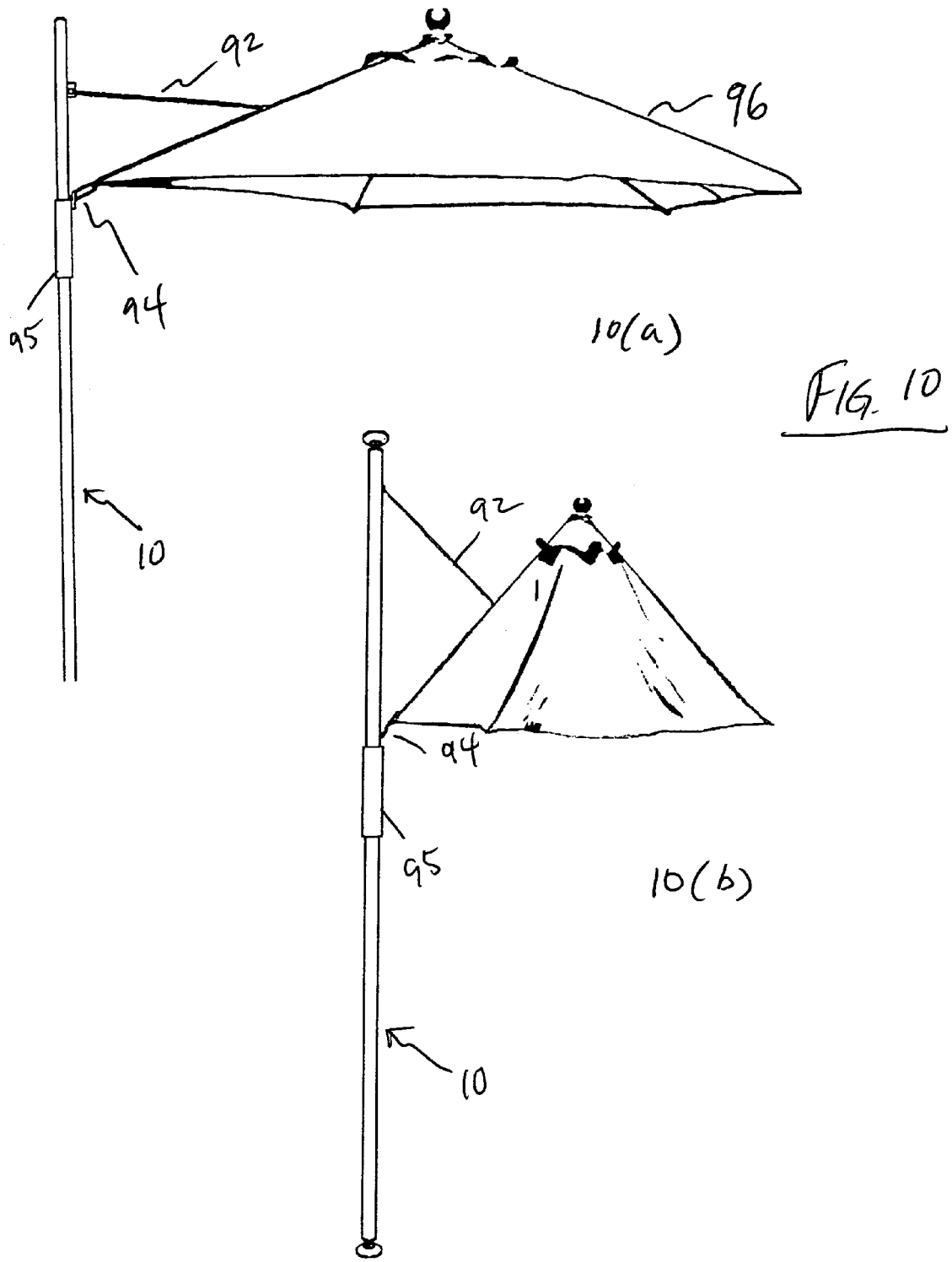
FIGS. 10(a)-(b) illustrate the exemplary umbrella attachment 96 for use with a vertically mounted support tool 10.

FIGS. 10(a)-(b) illustrate an exemplary umbrella 96 for use with the adjustable support tool 10. Here, the upper arm 92 from the umbrella 96 is attached to a stationery point on the support tool 10, while the lower arm 94 is attached to a sleeve 95 that can slide up and down the support tool 10. When the sleeve 95 is lowered by the user, the umbrella 96 is closed in a stowage position. When the sleeve 95 is raised, the umbrella 96 can be opened.

FIGS. 11(a)-(b) illustrates another exemplary attachment, which includes a universal attachment 60, 62 for attaching a typical umbrella 64. The universal attachment has a preferred elbow clamp 62 connected at each end of the extension arm 60. As can be appreciated by those skilled in the art, the "elbow clamp" 62 essentially consists of two clamps pivotally connected to each other. As shown, the elbow clamp 62 at the left end of the extension arm 60 firmly engages the vertical pole 10 to the extension arm 60, while the elbow clamp 62 at the right end of the extension arm 60 firmly engages an umbrella 64 to the extension arm 60.

Because each elbow clamp 62 is pivotally adjustable, the angles and orientation of the extension arm 60 and the umbrella 64 can be adjusted as necessary.

The "elbow" section 66 of the elbow clamp 62 has "teeth," or "gear," on the mating surface of on each side of the clamp, as shown in FIG. 11(b). The gear on both sides of the clamp, when properly mated, allow the elbow to be secured at multiple angles. The clamp on the other end of the teeth will be able to clamp to various poles and allow sliding "in and out" or "up and down". The systems together will be able to adjust to various height, angle, and distance from the mounting pole 10.

Internal Threading of the Hand Grip Tightener. It should be noted that the hand grip tightener 150 may be constructed with a novel way of achieving internal threading. The inside surface of the hand grip tightener 150 is threaded so as to be compatible with the threads on the threaded sleeve 205. However, as can be appreciated by those skilled in the art, it becomes more and more difficult as the threading has to reach further deeper within such cylindrical object. Often times, threading can only reach a limited depth, before the build-up of the threaded material causes more and more friction to the threading tooling. In accordance with the present invention, the threads on the inside surface of the hand grip tightener 150 are preferably made with less than 100% of the inside surface. In other words, the threads inside of the tightener 150 do not have to be continuous, but can be broken into intervals. Instead of making 100% of the threads, it can be made with thread intervals. While the threading movement is not affected, such interval threading allows more depth to be threaded, since the interval spacing allows the material to be removed during thread-making. During thread-making, if the build-up of spent material could be removed, there would be less friction, thus allowing more depth to be achieved, as can be appreciated by those skilled in the art.

It should also be noted that the threaded sleeve 205 and key 210 may be eliminated by using a threaded tube 120, which has a thread portion, or segment, formed near the top portion. This way, the tube 120 is engaged directly to the hand grip tightener 150 by their threading. The external sleeve 205, as well as the key 210, can be spared from the production process, thus reducing cost.

Although this invention has been described with reference to these specific embodiments, the descriptions are intended to be illustrative of the invention and are not intended to be limiting. Various modifications and applications may occur to those skilled in the art without departing from the true spirit and scope of the invention.

I claim:

1. An adjustable support tool for horizontal or vertical mounting, comprising:
    a rod, including a plurality of depressions formed thereon;
    a first foot assembly pivotally engaged to said rod at a first end of said rod;
    a tube, disposed to slidably receive a second end of said rod;
    a second foot assembly pivotally engaged to said tube;
    a threaded portion coupled to said second end of said rod;
    a hand grip tightener, disposed to receive said rod and to thread with said threaded portion, said hand grip tightener including internal threads for adjusting its grip on said threaded portion upon rotation of said hand grip tightener;
    a ratchet housing rotatably engaged to said hand grip tightener, said ratchet housing also slidably receiving said rod, said ratchet housing having a protrusion at its first end for resiliently engaging said hand grip tightener, said ratchet housing having a partially open side with a pair of flanges with holes formed thereon;

a ratchet pivotally engaged to said ratchet housing through a pair of said holes, said ratchet having a pawl formed on its end for releasably securing one of said depressions on said rod, said ratchet being biased by a ratchet spring such that it normally engages one of said depressions on said rod;

a safety lock pivotally engaged to said ratchet housing through another pair of said holes on said flanges, said safety locking being disposed to controllably prevent said ratchet from being released when said ratchet is engaged to said depression.

2. An adjustable support tool of claim 1, further comprising:

a spring wheel resiliently engaged to said ratchet housing at a first end, a second end of said spring wheel including a roller wheel rollably engaging to another one of said depressions, said spring wheel being positioned underneath said ratchet and at a section joining between said pair of flanges, said spring wheel being positioned such that it pushes said ratchet up when said rod is slided, thus causing said pawl to release from said depression.

3. An adjustable support tool of claim 1, wherein:
said threaded portion coupled to said tube is a threaded sleeve adapted to receive said tube.

4. An adjustable support tool of claim 3, further comprising:

a key ring placed on said tube between said hand grip tightener and said threaded sleeve, disposed to prevent said tube from rotating when said hand grip tightener is rotating.

5. An adjustable support tool of claim 3, wherein said rod is a D-shaped rod with said depressions formed thereon.

6. An adjustable support tool of claim 4, wherein said rod is a D-shaped rod with said depressions formed thereon.

7. An adjustable support too of claim 2, further comprising:

a bracket including a pair of opposing anchor extensions projecting in opposite direction, said anchor extension being rotatably engaging to said bracket;

a pair of adjustable clamps for clamping to one of said rod and tube, each of said clamps being engaged to each of said anchor extensions, each clamp having a movable prong and a fixed prong.

8. An adjustable support tool of claim 3, further comprising:

a bracket including a pair of opposing anchor extensions projecting in opposite direction, said anchor extension being rotatably engaging to said bracket;

a pair of adjustable clamps for clamping to one of said rod and tube, each of said clamps being engaged to each of said anchor extensions, each clamp having a movable prong and a fixed prong.

9. An adjustable support tool of claim 2, further comprising:

a sleeve, which is controllably moveable throughout at least a partial length of said support tool;

an umbrella, having a plurality of ribs extending from the tip of said umbrella to the edges;

an upper arm, pivotally connecting to one of said ribs at one end of said upper arm, and pivotally connecting to a fixed point on said support tool;

a lower arm, connecting to said rib at the edge, the other end of said lower arm connecting to said sleeve.

10. An adjustable support tool of claim 3, further comprising:

a sleeve, which is controllably moveable throughout a partial length of said support tool;

an umbrella, having a plurality of ribs extending from the tip of said umbrella to the edges;

an upper arm, pivotally connecting to one of said ribs at one end of said upper arm, and pivotally connecting to a fixed point on said support tool;

a lower arm, connecting to said rib at the edge, the other end of said lower arm connecting to said sleeve.

11. An adjustable support tool of claim 1, further comprising:

a first elbow clamp;
an extension arm;
shade means;
a second elbow clamp, wherein said first elbow clamp pivotally engages between said support tool and said extension arm, and said second elbow clamp pivotally engages between said extension arm and said shade means.

12. An adjustable support tool of claim 2, further comprising:

a first elbow clamp;
an extension arm;
shade means;
a second elbow clamp, wherein said first elbow clamp pivotally engages between said support tool and said extension arm, and said second elbow clamp pivotally engages between said extension arm and said shade means.

13. An adjustable mounting support tool for horizontal and vertical mounting, comprising:

at least one adjustable support tool, said support tool comprising:

a rod, including a plurality of depressions formed thereon;

a first foot assembly pivotally engaged to said rod at a first end of said rod;

a tube, disposed to slidably receive a second end of said rod;

a second foot assembly pivotally engaged to said tube;

a threaded portion coupled to said second end of said rod;

a hand grip tightener, for controllably threading with said threaded portion on said rod;

a ratchet housing rotatably engaged to said hand grip tightener, said ratchet housing also slidably receiving said rod, said ratchet housing having a protrusion at its first end for resiliently engaging to said hand grip tightener, said ratchet housing having a partially open side with a pair of flanges with holes formed thereon;

a ratchet pivotally engaged to said ratchet housing through a pair of said holes, said ratchet having a pawl formed on its end for releasably securing one of said depressions on said rod, said ratchet being biased by a ratchet spring such that it normally engages one of said depressions on said rod;

a spring wheel resiliently engaged to said ratchet housing at a first end, a second end of said spring wheel having a roller wheel rollably engaging to another one of said depressions, said spring wheel being positioned underneath said ratchet, said spring wheel being positioned such that it pushes said ratchet up when said rod is slided, thus causing said pawl to release from said depression;

a safety lock pivotally engaged to said ratchet housing through another pair of said holes on said flanges, said safety locking being disposed to controllably prevent said ratchet from being released when said ratchet is engaged to said depression.

14. The adjustable mounting support tool of claim 13, further comprising:
a bracket including a pair of opposing anchor extensions projecting in opposite direction, said anchor extension being rotatably engaging to said bracket;
a pair of adjustable clamps for clamping to said support tool, each of said clamps being engaged to each of said anchor extensions, each clamp having a movable prong and a fixed prong;
an awning attachment, for mounting by said bracket to said adjustable support tool.

15. The adjustable mounting support tool of claim 14, wherein said awning is one of:
a sunshade with a torque bar, said torque bar being attachable to said bracket; and
an umbrella with an adjustable arm, said arm being attachable to said bracket.

16. The adjustable mounting support tool of claim 14, wherein said awning attachment comprises:
a first arm, pivotally engaged to an upper portion of said support tool;
a second arm, slidably engaged to said support tool;
an umbrella, coupled to said first arm and said second arm, said umbrella being disposed to controllably open and close upon a movement of said second arm on said support tool.

17. The adjustable mounting support tool of claim 13, further comprising:
a sleeve, which is controllably moveable throughout a partial length of said support tool;
an umbrella, having a plurality of ribs extending from the tip of said umbrella to the edges;
an upper arm, pivotally connecting to one of said ribs at one end of said upper arm, and pivotally connecting to a fixed point on said support tool;
a lower arm, connecting to said rib at the edge, the other end of said lower arm connecting to said sleeve.

18. The adjustable mounting support tool of claim 13, further comprising:
a first elbow clamp;
an extension arm;
shade means;
a second elbow clamp,
wherein said first elbow clamp pivotally engages between said support tool and said extension arm, and said second elbow clamp pivotally engages between said extension arm and said shade means.

19. An adjustable support tool kit, comprising:
at least one adjustable support tool, comprising:
a rod having a plurality of depressions formed thereon;
a tube for slidably receiving said rod;
a threaded portion coupled to said tube;
a tightener with internal threads for turnably engaged to said threaded portion on said tube;
a ratchet housing rotatably engaged to said tightener, said ratchet housing including a ratchet pivotally engaged thereto, said ratchet being controllably engaged to one of said depressions on said rod;
a safety lock pivotally engaged to said ratchet housing, for preventing said ratchet to be moved.

20. The adjustable support tool kit of claim 19, further comprising:
an awning attachment, comprising:
a shade;
a control bar, for controllably release said shade from its stowage position;
at least one bracket, said bracket comprising:
a brace for engaging to said torsion bar of said awning attachment;
a pair of opposing anchor extensions projecting in opposite direction from said brace, said anchor extension being rotatably engaging to said bracket;
a pair of adjustable clamps for clamping to said support tool, each of said clamps being engaged to each of said anchor extensions, each clamp having a movable prong and a fixed prong.

21. An adjustable support tool kit of claim 20, wherein said shade comprises:
an umbrella, controllable by said control bar.

22. An adjustable support tool kit of claim 20, further comprising:
a wheel spring resiliently attached to said ratchet housing, one end of said wheel spring being rollably attached to another one of said depressions, said wheel spring pushing up said ratchet when said rod is slid.

23. An adjustable support tool kit of claim 19, further comprising:
a sleeve, which is controllably moveable throughout a partial length of said support tool;
an umbrella, having a plurality of ribs extending from the tip of said umbrella to the edges;
an upper arm, pivotally connecting to one of said ribs at one end of said upper arm, and pivotally connecting to a fixed point on said support tool;
a lower arm, connecting to said rib at the edge, the other end of said lower arm connecting to said sleeve.

24. An adjustable support tool kit of claim 19, further comprising:
a first elbow clamp;
an extension arm;
umbrella means;
a second elbow clamp,
wherein said first elbow clamp pivotally engages between said support tool and said extension arm, and said second elbow clamp pivotally engages between said extension arm and said umbrella means.

* * * * *